Jan. 4, 1944. R. PASH 2,338,533
MECHANICAL MOTION
Filed Sept. 11, 1942 3 Sheets-Sheet 1

INVENTOR
R. PASH
BY E.R. Nowlan
ATTORNEY

Jan. 4, 1944.　　　　R. PASH　　　　2,338,533
MECHANICAL MOTION
Filed Sept. 11, 1942　　　3 Sheets-Sheet 2
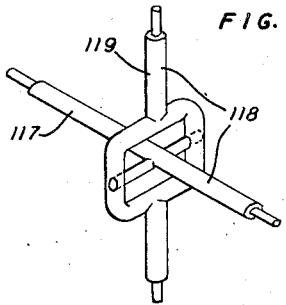
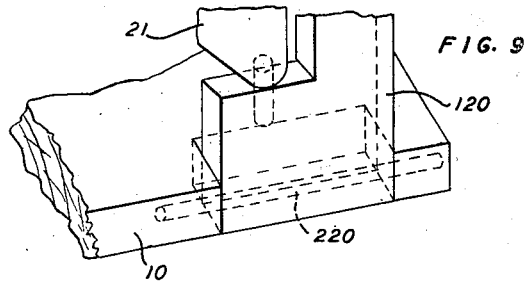
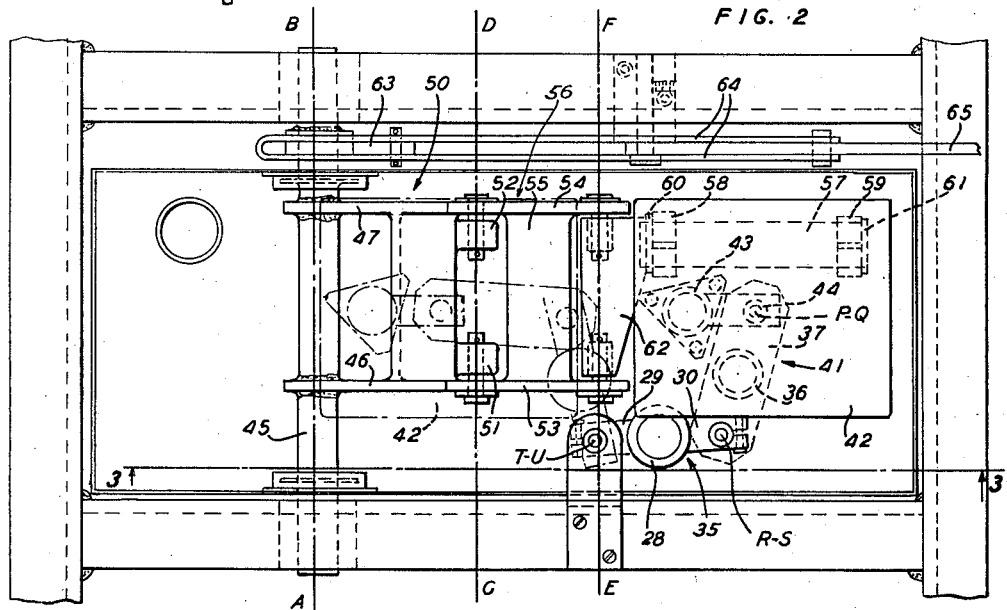
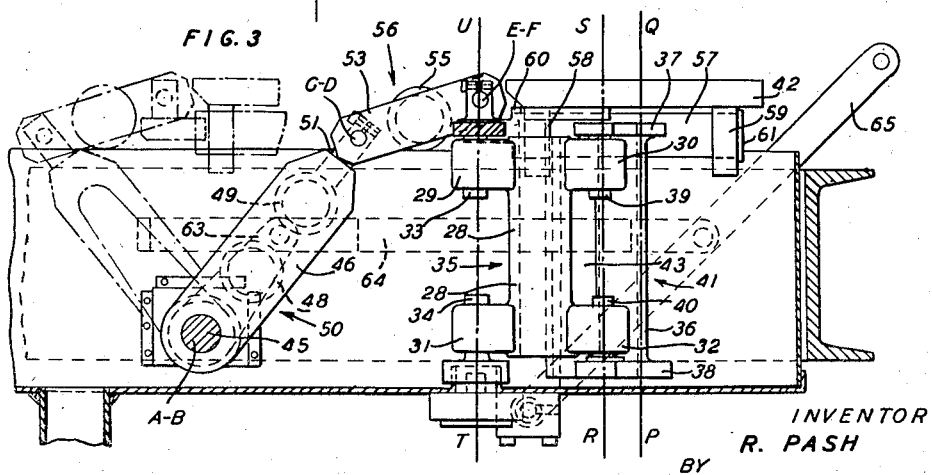
INVENTOR
R. PASH
BY
E. R. Nowlan
ATTORNEY Jan. 4, 1944.  R. PASH  2,338,533
MECHANICAL MOTION
Filed Sept. 11, 1942  3 Sheets-Sheet 3

INVENTOR
R. PASH
BY
E. R. Nowlan
ATTORNEY

Patented Jan. 4, 1944

2,338,533

UNITED STATES PATENT OFFICE 2,338,533

MECHANICAL MOTION

Robert Pash, Roselle, N. J., assignor to Western Electric Company, Incorporated, New York, N. Y., a corporation of New York Application September 11, 1942, Serial No. 457,938

6 Claims. (Cl. 74—103)

This invention relates to a mechanical motion, and more particularly to a mechanical linkage for converting rotary motion into rectilinear motion and to a practical application thereof in a machine tool.

There are many mechanical motions or linkages known for converting rotary motion of a lever or the like into motion which is in theory truly or closely approximately rectilinear. In most instances the members composing such a linkage all lie in and move substantially in one common plane or in two or more parallel planes. The stiffness of such a structure transversely of this plane or these planes is then not inherent in the dynamic geometry of the linkage but depends upon the construction and rigidity of the various elements and still more of their pivotal connections. Hence such linkages are ordinarily usable only or chiefly as guiding factors and cannot be relied on to act as movable supports against stresses, especially transverse stresses.

An object of the present invention is to provide a mechanical linkage for converting rotary motion into accurately rectilinear motion, which linkage shall have inherent rigidity in all directions transverse to the direction of the rectilinear motion.

A further object of the invention is to provide means to support and guide a tool carriage or work carriage to have inherently rectilinear freedom of motion only, without reliance upon any auxiliary rectilinear or rectiplanar guide member.

With the above and other objects in view, the invention may be embodied in a linkage comprising a two dimensionally extended primary member rotatable freely about a fixed axis, a similarly formed secondary member secured to the primary member to be rotatable with respect thereto about an axis parallel to and spaced from the axis of rotation thereof, another pair of primary and secondary members similar in form, construction and mutual relation to the first pair, but having their two mutually parallel axes of rotation not parallel to the axes of the first pair, and a link pivotally secured to both secondary members to be rotatable with respect to each secondary member about an axis parallel to the axis connecting that member to its corresponding primary member.

Other objects and features of the invention will appear from the following detailed description of embodiments thereof taken in connection with the accompanying drawings in which the same reference numerals are applied to identical parts in the several figures and in which Fig. 1 is a diagrammatic perspective representation of an illustrative linkage embodying the invention and particularly designed to make clear the dynamic geometric principles involved;

Fig. 2 is a plan view of an analogous linkage applied to support and guide a work carriage in a machine tool and is an enlarged view on the line 2—2 of Fig. 7;

Fig. 3 is a section on the line 3—3 of Fig. 2;

Fig. 8 is a detached perspective view of a modified part of the showing of Fig. 1; and Fig. 9 is a similar view of another modified part of the showing of Fig. 1.

Figure 1:
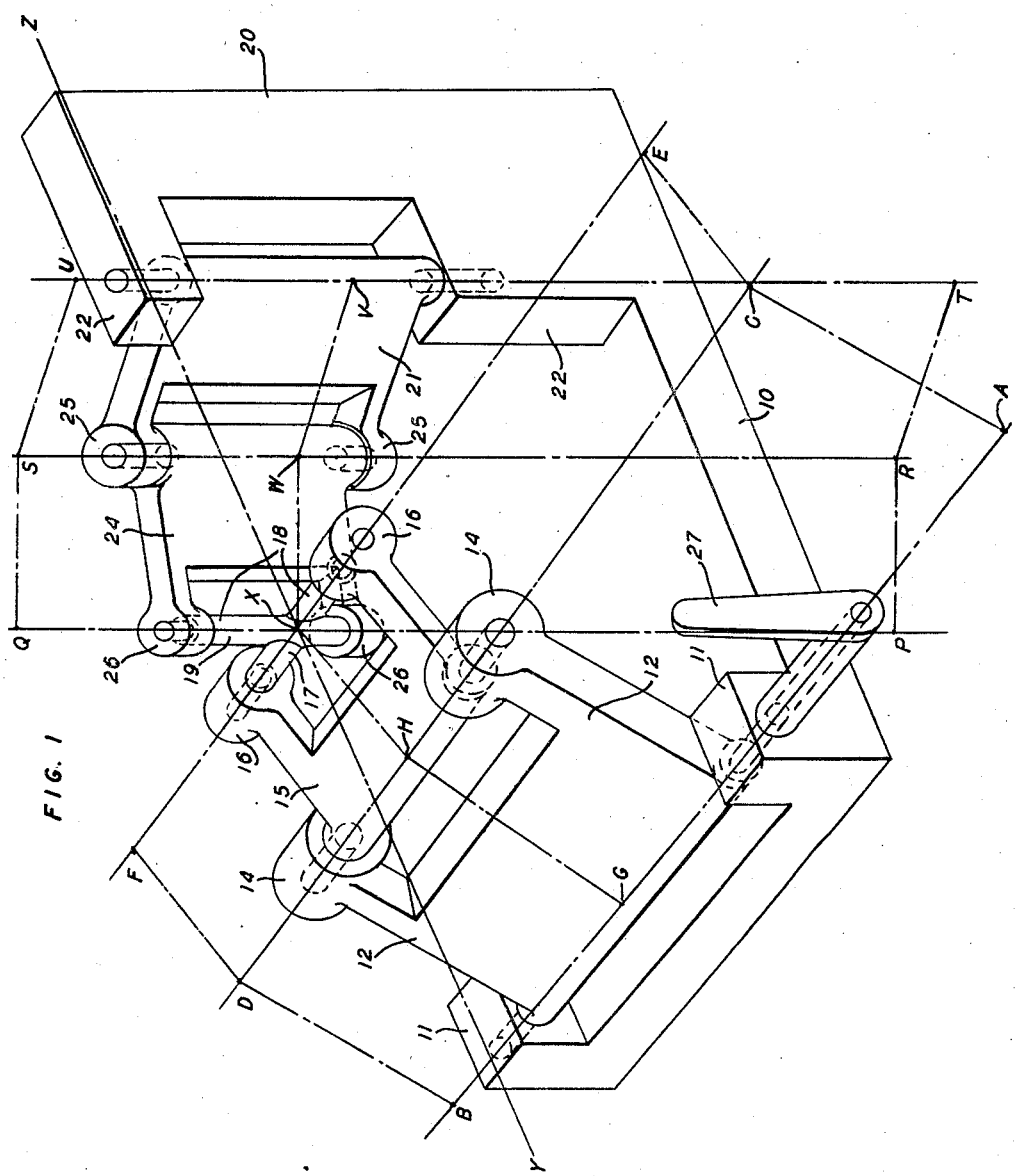

The schematic diagram of Fig. 1 shows an ideal mechanism constructed to exhibit clearly, and with as little irrelevant detail as possible, the principles of dynamic geometry underlying the invention. A heavy and rigid slab-like base 10 of rectangularly oblong shape has at the front and back corners of its left end a pair of fixed bearing blocks 11—11 in which is journalled one edge of a generally plate-like member 12 in such fashion that the member 12 is freely rotatable on the axis A—B but without any other freedom of motion relatively to the base 10. The opposite edge of the member 12 is provided with a pair of bearing blocks 14—14 in which is journalled a yoke-like member 15 to be freely rotatable on the axis D—C with respect to the member 12 but to have no other freedom of motion relatively thereto. The outer ends of the arms of the yoke 15 are provided with bearings 16—16 in which is journalled the horizontal bar 17 of a universal joint cross-member 18 in such fashion as to be freely rotatable on the axis E—F with respect to the yoke 15 but without any other freedom of motion relatively thereto. These parts are all so proportional and related that the three axes A—B, C—D and E—F are always parallel each to each and to the plane top surface of the base 10.

At the front corner of the right end of the base 10 is a fixed, rigid, vertically upstanding bracket 20 on which is journalled in bearings 22—22 a plate-like member 21, which for simplicity of discussion, may be thought of as identically like the member 12. It is so arranged as to be freely rotatable on the axis T—U with respect to the bracket 20 and without any other freedom of motion relatively thereto. A yoke 24, identically like the yoke 15, is journalled in bearings 25—25 on the member 21 to be freely rotatable on the axis R—S relatively to the member 21 but to have no other freedom of motion relatively thereto; and the vertical bar 19 of the universal joint connector cross 18 is journalled in bearings 26—26 on the yoke 24 to be freely rotatable on the axis P—Q with respect thereto but to have no other freedom of motion relatively thereto. These several members are so proportioned and related that the three axes T—U, R—S and P—Q are always parallel each to each and perpendicular to the plane top surface of the base 10.

Further to clarify the discussion let X be the point of intersection of the axes of the two integral bars 17 and 19 of the universal cross 18; let the point X be midway between the bearings 16—16 and midway between the bearings 14—14 and midway between the bearings 11—11; and similarly let the point X be midway of the bearing pairs 26—26, 25—25 and 22—22.

Now imagine, for the moment, the bar 19 annihilated, and consider the chain of members from 17 back through 15 and 12 to the base 10. Let G be the point of the axis A—B midway between the bearings 11—11 and draw GH perpendicular to AB and intersecting the axis C—D at H. By the general symmetry of the members 12 and 15 discussed above, H is midway between the bearings 14—14. Since AB and CD are parallel, GH perpendicular to AB is also perpendicular to CD. Similarly, it will be clear from the structure, that the line HX is perpendicular to both CD and EF. The member 12 is freely rotatable through a considerable angle on the axis A—B (within obvious mechanically determined limits). No matter what position the member 12 may be in, the member 15 is freely rotatable through a considerable angle on the axis C—D fixed in the member 12. The point H has one degree of freedom about the fixed point G because the point H is free to take any position on a circular arc centered at G and in a plane perpendicular to the axis A—B at G. For any given position of H, the point X is similarly free to take any position on a circular arc centered at H and in a plane perpendicular to the axis C—D at H. The plane perpendicular to C—D at H coincides with the plane perpendicular to the axis A—B at G since GH is perpendicular to both AB and CD. Since the point X has one degree of freedom on this plane about the point H as a center, and the point H has one degree of freedom in the same plane about the fixed point G, the point X has two degrees of freedom in the same plane. By the links 12, 15 and 17 (or 18), arranged as described, the point X is therefore confined to the fixed vertical plane midway between the bearings 11—11, perpendicular to the axes A—B, C—D and E—F, and therefore perpendicular to the plane top surface of the base 10. Thus the point X, so far as constrained by the links 12, 15 and 18, is free to take any position within a considerable area in this plane but not outside this plane.

The links 21, 24 and 19 (or 18) can be similarly shown to form a system of the same character tied to the base at the fixed vertical axis T—U. Hence the point X, so far as constrained by the links 21, 24 and 18, is free to take any position within a considerable area of the fixed plane perpendicular to the axis T—U at the point V midway between the bearings 22—22, defined by the radii VW and WX. But the links 21, 24 and 18 will not permit the point X to take any position outside of this plane.

The point X is therefore confined by the two linkages joined at the element 18 to lie in both of these fixed planes and is therefore confined to the fixed straight line YZ in which these two fixed planes intersect. So long as the axes A—B and T—U are mutually truly perpendicular, whether in fact they intersect or not, and so long as the axes A—B, C—D and E—F are mutually truly parallel and the axes T—U, R—S and P—Q are mutually truly parallel, the point X at the center of the member 18 and, in fact, the whole member 18 will move freely to and fro within the mechanical limits of the linkages, in true rectilinear motion, when the handle lever 27, rigidly connected to the member 12 through one of the bearings 11—11, is moved to and fro.

The rectilinear motion of the member 18 thus created, does not derive its rectilinearity from any pre-existent rectilinear or rectiplanar guide or slide. And the resistance of the member 11 to deflection from its straight line path is substantially the same in all directions transverse to its path. The anchorage through the links 15 and 12 in the bearings 11—11 resists the horizontal component of any force tending to deflect the member 18, while the vertical component of any such force is exerted through the links 24 and 21 upon the anchorage in the bearings 22—22. Every motion of any element of the structure with respect to any other element connected thereto is rotary. Hence the accuracy of rectilinearity of motion of the member 18 with respect to the base 10 depends only on the rigidity of the various elements and on the rigidity of the bearings connecting them. The bearings occur in pairs; and the member of each pair can be spaced as far apart and made as massive as requisite, while the various elements may also be made as massive and rigid as necessary.

A moment's consideration will show further that the axes E—F and P—Q need not necessarily intersect. So long as the member then replacing the cross 18 is rigid, the axes E—F and P—Q may be spaced apart.

For convenience of further discussion and description and of accuracy of statement in claims, the phrase "folding door linkage" will be used in the ensuing part of the description and in the claims to means specifically a primary link member analogous to 12 or 21, pivotable on a main axis such as A—B or T—U having a secondary link member analogous to 15 or 24 secured to be movably carried thereby and to be pivotable thereon on an axis (such as C—D or R—S) parallel to but distinct from the main axis (A—B or T—U).

In Figs. 2, 3, 4 and 5 there is shown an application of the mechanism above discussed, modified to support the worktable of a machine tool and to drive and at the same time guide the table in rectilinear motion. There is a vertical folding door linkage comprising a primary member generally indicated at 33 and a secondary member generally indicated at 41. The primary member is an H-shaped rigid structure, the H lying on its side. It comprises a vertical main member 28, the crossbar of the H. This is a rigid hollow cylinder of metal. At the top are two outwardly extruding horizontal arm pieces 29 and 30, welded to the upper end of the member 28 at opposite sides thereof; and at the bottom are like arm pieces 31 and 32, similarly secured, the four arms being coplanar, the arm 29 being directly over the arm 31 and the arm 30 directly over the arm 32. The arms 29 and 31 are pivotally secured as indicated on members 33 and 34, respectively, which are rigidly mounted on suitable parts of the machine frame so that the whole member 35 is freely rotatable on a fixed vertical axis T—U determined by the pivot members 33 and 34. The secondary member 41 comprises a rigid hollow cylindrical body member 36 upon the upper and lower ends of which are welded cross-arms 37 and 38 respectively, so that the member 41 is also roughly H-shaped with the H on its side and the member 36 the vertical crossbar of the H. The arms 30 and 32 of the primary member 35 are pivotally connected as shown, respectively to corresponding members 39 and 40 mounted on the respective forward ends of the cross-arms 37 and 38. The secondary member 41 is thus carried on and movable with the primary member 35 and is also freely rotatable on the member 35 about the axis R—S of the members 30, 39, 32 and 40. The worktable 42 has rigidly secured on its under side a vertical, rigid, hollowly cylindrical support 43 with rightwardly extending arms rigid thereon near the top and bottom which are pivotally mounted in the rear ends of the cross-bars 37 and 38 as indicated at 44 in Fig. 2. The table 42 is thus supported on the secondary member 41 of the vertical folding door linkage described and is pivotable with respect to the member 41 about the axis P—Q. Being thus mounted on the folding door linkage 35, 41, the table 42 is constrained to horizontal motion, but is free to move right or left and front or back so far as the linkage 35, 41 is concerned.

In the left portion of Figs. 2 and 3 is shown a horizontal shaft 45 journalled in bearings in the machine frame to be rotatable about a horizontal axis A—B. Two mutually parallel cross-arms 46 and 47 are secured near their left ends on the shaft and have a pair of rigid, hollowly cylindrical stiffening body members 48 and 49 rigidly secured between them at their centers. The members 48 and 49 with their cross-arms 46 and 47 form the primary member, generally indicated at 50, of a folding door linkage, pivotable about the fixed horizontal axis A—B. Pivot arms 51 and 52 are rigidly secured to the body member 49 near its ends and are pivotally connected respectively to the cross-arms 53 and 54 rigidly secured on the ends of the hollow body cylinder 55 of the secondary member, generally indicated at 56, of the horizontal folding door linkage. The secondary member 56 is thus carried on and movable with the primary member 50 and is also freely pivotable with respect to the primary member about the axis C—D of the pivot connection between the primary and secondary members.

A cylindrical member 57 is mounted on the under side of the table 42 in trunnions 58 and 59, to be freely rotatable in the trunnions, and is prevented from any longitudinal motion in the trunnions (and hence with respect to the table 42) by collars 60 and 61 suitably secured on the cylinder 57. A trapezoidal plate-like connecting member 62 is rigidly secured to the cylinder 57 and is pivotally connected to the extremities of the cross-arms 53 and 54 of the secondary member 56. The members 56 and 57 are thus freely rotatable with respect to each other about the axis E—F.

As already described, the table 42 is supported on the linkage 35, 41, and is also compelled by that linkage to confine any motion which any given point of the table may have to a fixed horizontal plane. The table 42 is also connected through the cylinder 57 and member 62, to the linkage 49, 56 in such fashion that any motion which any given point of the table may have is confined to a fixed vertical plane. Hence any point of the table (and therefore any point) must move in the straight line intersection of the two planes. The table 42 as a whole, therefore, is incapable of any rotational motion, and is free to move only in rectilinear, horizontal, left to right and back reciprocation.

To effect such reciprocation, a lever 63 may be rigidly mounted on shaft 45 and connected by a pull rod 64 to an operating lever 65. Working the lever 65, to and fro manually or otherwise, will then reciprocate the table 42 in horizontal, rectilinear motion.

Figure 6:
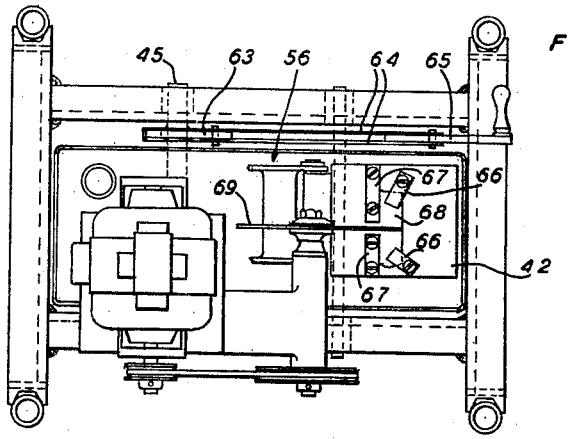
Fig. 6 is a plan view of the entire tool on a smaller scale.
Figure 7:
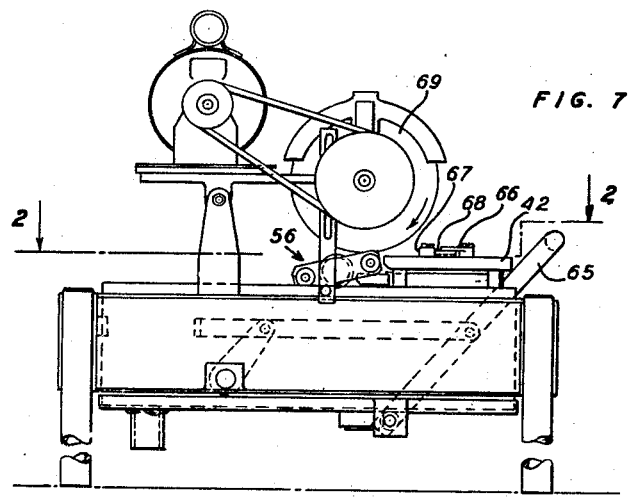
Fig. 7 is a front elevation of the showing of Fig. 4.
Figure 4:
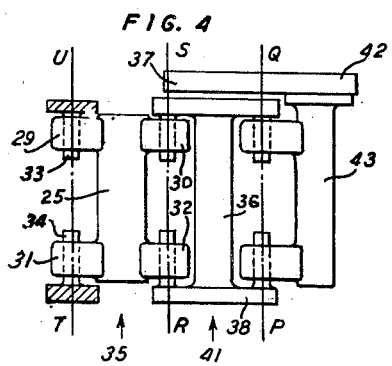
Fig. 4 is a detached view in side elevation of the vertical portion of the linkage of Fig. 2 straightened out.
Figure 5:
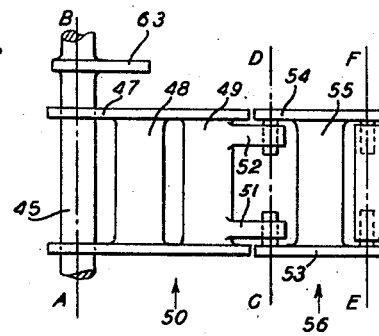
Fig. 5 is a similar plan view of the horizontal portion thereof.

It is to be noted that in Figs. 2 and 3, the table 42 and the two folding door linkages connected to it are shown in full lines in the same position they occupy in Figs. 6 and 7. Furthermore, in Fig. 2, the vertical linkage 35, 41 and the table 42 are also shown in dotted outline in another position. In Fig. 2, however, the horizontal linkage 50, 56 is shown in only the one position to avoid confusing the drawings. On the other hand, in Fig. 3, the table and the horizontal linkage are shown in both positions, and the vertical linkage in only the one position.

Figs. 6 and 7 illustrate the application of the arrangement of Figs. 2, 3, 4 and 5 in a machine tool, namely a machine for slitting slabs of quartz crystal with accurately straight saw cuts. The table 42 is provided with suitable clamping means 66 and aligning means 67 to hold a crystal slab 68 on the table while the latter is reciprocated, in the manner and by the means described above, in straightly rectilinear motion under the slitting saw 69.

In the ideal mechanism of Fig. 1, the bars 17 and 19, which effect a connection between the members 15 and 24 of the two linkages, are rigidly joined in one integral member 18. In an ideal mechanism this is possible, whereas in a practical embodiment it may not be. In theory and in practise both, it is not necessary for the directions of the axes A—B and T—U to be mutually perpendicular. It is only necessary that they be not parallel or coincident, in order that the plane of motion determined by either for the point X may intersect the plane determined by the other. In theory it is necessary that the axes A—B, C—D and E—F be mutually exactly parallel, as also the axes T—U, R—S and P—Q. Otherwise the path Y—Z of the point X will be the doubly curved intersection of two warped surfaces instead of planes. In actual practise, however, ideal conditions cannot be met, or, if met by chance, cannot be maintained. If the practical mechanism, such as that of Figs. 2 and 3, be constructed with the best of modern methods and with the best of modern bearing devices having no perceptible looseness, still the three axes of rotation in each of the two folding door linkages will deviate from true mutual parallelism by some amount, perhaps not even measurably large and still effective to cause binding of member against member and thus resist the free travel of the table 42 if the member 62 be rigidly secured to the table. Since the principles of dynamic geometry on which the apparatus is constructed are exactly true, no least variation at all is tolerable if the mechanism is to function with such a rigid link as the cross 18 between the two folding door linkages. Hence, in the practical device of Figs. 2 and 3, the cylinder 57 is made rotatable but not slidable in the trunnions 58 and 59.

If, for example, the axis C—D be minutely out of parallelism to the axis A—B while the axis E—F is truly parallel to the axis C—D and hence is also minutely out of parallelism to the axis A—B, then as the table travels from one extreme position of its excursion to the other, the plate 62 will tend to rotate minutely relatively to the table about the axis of the cylinder 57 as well as to turn minutely in a direction transverse to the motion of the table. The rotative stress about the axis of the cylinder is quite effective to produce binding in the bearings all through both linkages, because of the relatively large distance between the two members of each pair of bearings; while the elastic yielding throughout the chains of linkage members required to ease the turning stress is negligible. Hence by providing the rotatable but otherwise unyielding connection afforded by the cylinder 57, rotatable but not slidable in its trunnions, any binding stresses in the linkage chains due to non-parallelism of the several axes of rotation, are relieved, while the departure from strict, theoretical rectilinearity, and more especially rectiplanarity, of motion of the table thus permitted is, in practise, not detectable.

This is equivalent to substituting, in the ideal structure of Fig. 1, for the rigid cross 18 some such arrangement 118 as that shown in Fig. 8, where the bar 117, replacing the bar 17, is pivoted in the bar 119, replacing the bar 19. The like result may also be accomplished in other ways; for example, by making the bracket 20 pivotable on the base 10 about an axis not having the same direction as either the axis A—B or the axis T—U, as shown at 120 and 220 in Fig. 9.

The embodiments disclosed and discussed above are illustrative and may be variously modified and adapted without departing from the spirit and scope of the invention as described and particularly pointed out in the appended claims.

What is claimed is:

1. A mechanical motion to convert rotary into rectilinear motion and comprising a base, two folding door linkages mounted upon the base and having their main axes not parallel, and a unit connecting the secondary members of the two linkages and pivotable upon each secondary member about an axis parallel to the axis about which the secondary member is pivotable on its primary member, the said unit comprising two elements pivotable upon each other about an axis whose direction is not parallel to either of the directions of the main axes of the two linkages.

2. A mechanical motion to convert rotary into rectilinear motion and comprising a base, two folding door linkages mounted upon the base and having their main axes not parallel, and means connecting the secondary members of the two linkages and pivotable upon each secondary member about an axis parallel to the axis about which the secondary member is pivotable on its primary member, the primary member of one of the said linkages being mounted upon the base to have its axis of rotation pivotable about an axis whose direction is not parallel to either of the directions of the main axes of the two linkages.

3. In a machine, a mechanical motion to support a body and to convert rotary motion of a member of the mechanical motion into rectilinear motion of the body, the said motion comprising a folding door linkage mounted in the machine to have the direction of the main axis of the linkage invariable, a second folding door linkage mounted in the machine with the main axis of the second linkage not parallel to the main axis of the first linkage and with the main axis of the second linkage pivotable about an axis whose direction is not parallel to either of the directions of the main axes of the linkages, and means to connect a body to be supported and moved in rectilinear motion to the secondary member of each linkage to be pivotable thereon about an axis parallel to the axis of rotation of the secondary member with respect to its primary member.

4. In a machine, a mechanical motion to support a body and to convert rotary motion of a member of the mechanical motion into rectilinear motion of the body, the said motion comprising a folding door linkage mounted in the machine to have the direction of the main axis of the linkage invariable, a second folding door linkage mounted in the machine with the main axis of the second linkage not parallel to the main axis of the first linkage, and means to connect a body to be supported and moved in rectilinear motion to the secondary member of each linkage to be pivotable thereon about an axis parallel to the axis of rotation of the secondary member with respect to its primary member, the connecting means including two elements pivotable upon each other about an axis whose direction is not parallel to either of the directions of the main axis of the linkages.

5. In a machine having a tool and a worktable to coact therewith, a pair of folding door linkages mounted in the machine with the directions of their main axes not parallel to each other and perpendicular to the direction of travel of the worktable, and means to connect the worktable to the secondary member of each linkage to be supported and guided thereby and to be pivotable thereon about an axis parallel to the main axis of the linkage, the connecting means including two elements pivotable upon each other about an axis whose direction is not parallel to either of the directions of the main axes of the linkages.

6. A mechanical motion to convert rotary into rectilinear motion and comprising a base, two folding door linkages mounted upon the base and having their main axes not parallel, and a unit connecting the secondary members of the two linkages and pivotable upon each secondary member about an axis parallel to the axis about which the secondary member is pivotable on its primary member, one of the links of the entire chain being pivotable also with respect to another link of the chain about an axis not parallel to either of the directions of the two main axes.

ROBERT PASH.